May 8, 1934.  R. M. HEINTZ  1,958,043
MAGNETO FIELD MEMBER
Filed Dec. 9, 1932
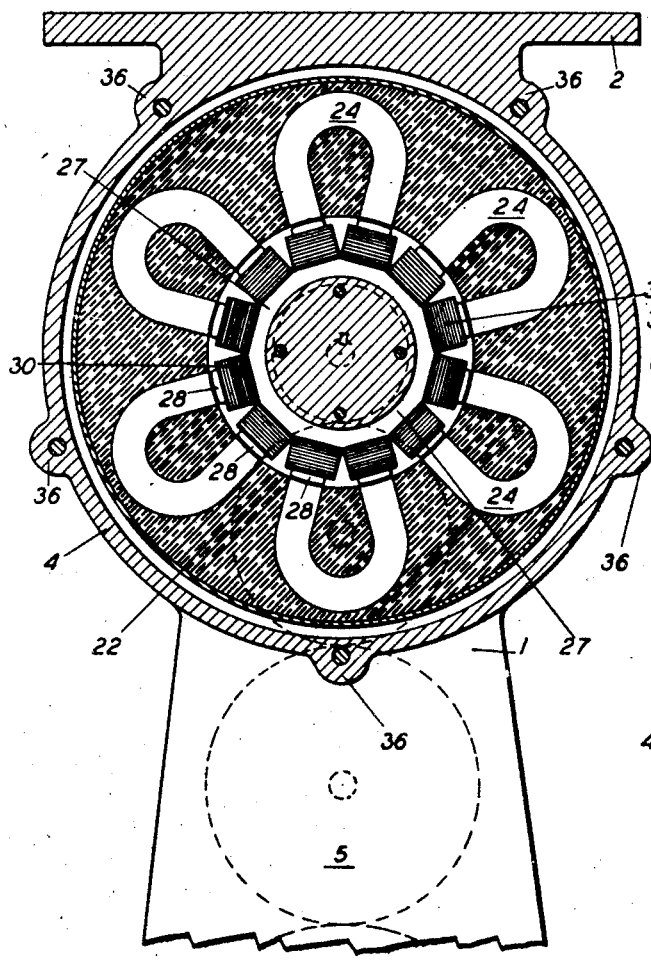
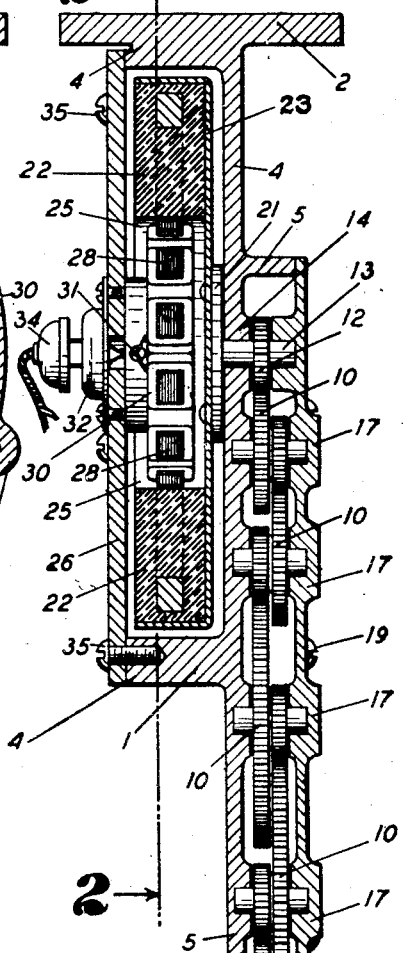
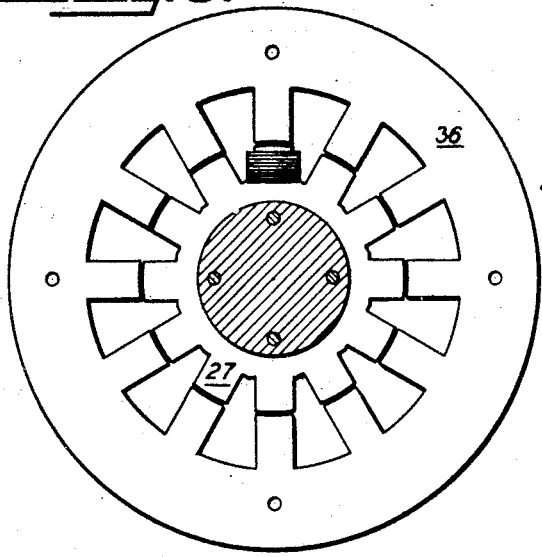
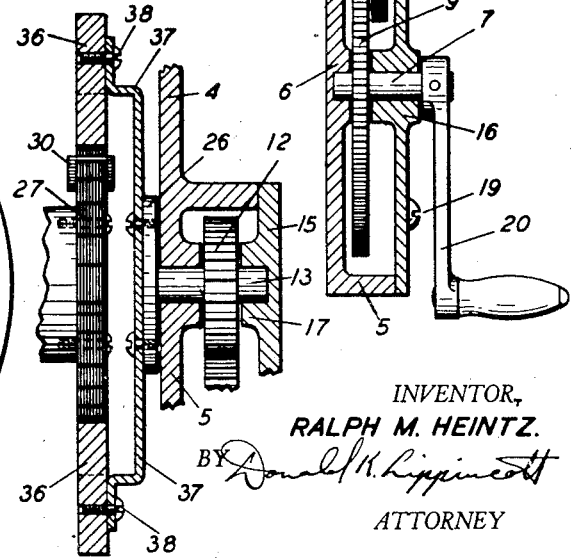
INVENTOR,
RALPH M. HEINTZ.
BY
ATTORNEY Patented May 8, 1934

1,958,043

UNITED STATES PATENT OFFICE 1,958,043

MAGNETO FIELD MEMBER

Ralph M. Heintz, Palo Alto, Calif., assignor to Heintz & Kaufman, Ltd., San Francisco, Calif., a corporation of Nevada Application December 9, 1932, Serial No. 646,407

6 Claims. (Cl. 171—252)

My invention relates to a magneto field and more particularly to such a field as may be applied to a current generator of the inductor type.

Among the objects of my invention are: To provide a unitary field structure for a magneto; to provide a field structure for a magneto in which the magnetic elements are embedded in a moldable material; to provide a field structure for a magneto capable of rotation or oscillation at high speed; and to provide a unitary molded field structure for magneto generators of small dimensions and high peripheral speed.

Other objects of my invention will be apparent or will be specifically pointed out in the description forming a part of this specification, but I do not limit myself to the embodiment of my invention herein described, as various forms may be adopted within the scope of the claims.

Referring to the drawing:

Figure 1 is a longitudinal sectional view of a small portable hand-driven alternator, or magneto.

Figure 2 is a cross sectional view of the generator taken along the plane indicated by the line 2—2 in Figure 1.

Figure 3 is a diagrammatic plan view of a unitary field structure of different construction.

Figure 4 is a sectional view of the field shown in Figure 3 as applied to the generator shown in Figure 1.

In the design of small rotating magneto generators, especially those in which it is desired to reduce weight to a minimum, high rotational speeds are imperative, and as it is usually more convenient to rotate a permanent magnetic field rather than an armature having pickup coils, such a magnetic field must be so constructed as to stand rotational stresses without appreciable distortion at speeds from 4,000 to 6,000 R. P. M.

Broadly speaking my invention comprises a field structure capable of being rotated at high speeds, in which the magnetic elements are embedded or molded in non-magnetic material. I prefer to use a non-magnetic, insulating material, and leave only the pole faces exposed, in such a position as to cooperate with and affect the armature coils to produce current when rotated.

Reference is made to the drawing in which a preferred type of rotating generator is illustrated. In Figures 1 and 2, a body casting 1 is formed with an integral base plate 2, and a generator housing 4 on one side of the casting, and a gear train housing 5 on the other.

At the extreme end of the gear train housing 5 there is a bearing boss 6 to which is fitted a handle gear shaft 7 having a handle gear 9 solidly affixed thereto. At intervals along the housing are inserted, in the same manner, intermediate gears 10 and pinions 11 all meshing properly to drive a generator gear 12 mounted on a generator shaft 13 which extends through a generator bearing 14 into the generator housing. The exposed end of the handle gear shaft is longer than that of the other gear shafts so that when a gear housing cover 15 is placed over the train of gears, this shaft will project through the cover bearing 16, while the ends of all the other shafts will fall into cover bearings 17. The cover is held in place by cover bolts 19. A handle 20 is keyed on the handle gear shaft and the gear train is in condition to transmit power to the generator shaft 13 when the handle is turned. I prefer to so design the train so that when the handle is turned at 40 R. P. M. the generator shaft will revolve at 4,000 R. P. M. or a step up ratio of 100 to 1.

Preferably formed integral with the generator shaft 13, but located inside the generator housing, is a mounting flange 21 to which is bolted a unitary field structure 22, the bolts being centrally located around the generator shaft, and passing through a cup frame 23 into the mounting flange. This cup frame has the form of a shallow pan, and is of stiff, non-magnetic material such as aluminum, or certain of the harder aluminum alloys, and is of sufficient thickness to form the foundation and drive web for the field unit.

Six permanent U-shaped magnets 24, of cobalt-chrome steel, capable of giving high magnetic densities when charged, are held within the cup by being embedded or molded in position within the cup. The material in which they are molded is non-magnetic, insulating material such as the phenolithic condensation products, casein plastics, or like material.

The magnets are symmetrically arranged with their pole faces terminating on the face of an inner armature channel 25 concentric with the outer rim of the field cup, and are completely within the molded material except for the exposed pole faces, and are supported only by the molded material, which in turn is held in the cup. The molded material with its contained magnets now forms a rim around the armature channel, and as the molding has included the cup frame, the magnets are effectively bonded to said frame. Thus turning the field cup will revolve the entire field structure.

When six magnets are used, twelve pole faces are exposed to the armature channel, and I prefer to design the magnets so that the distance between each pole face is exactly equal to the width of a pole face. After the molding has taken place it may be desired to center the field structure in a lathe, and grind the exposed faces of the magnets, and the intervening molding material to form a smooth, exact surface.

A generator cover 26 is provided for the generator housing 4 carrying a central laminated armature core 27 provided with twelve radiating core projections 28 extending toward the pole faces. I prefer to make these core projections at their outer ends of substantially the same cross section as the magnet pole faces. On these projections, armature coils 30 are mounted, connected in series and brought out through leads 31 to a receptacle 32. A work circuit may be plugged in as indicated by a plug cap 34.

The generator cover is firmly bolted on to the generator housing by housing bolts 35 passing through the housing into cover bosses 36 spaced at intervals around the housing rim.

It will thus be seen that the entire armature structure may be removed as a unit by removing the cover, and, by using accurate machinist practice throughout, the clearance between armature and rotating field may be small.

In use, the base 2 of the fully assembled generator may be firmly bolted or otherwise secured to any foundation available and the handle turned. The magneto field, rotating around the stationary armature at approximately 4,000 R. P. M. will produce alternating current at about 400 cycles per second which may then be utilized as A. C. or, in conjunction with a rectifier, be used as D. C.. The output wattage will depend on design and size.

The magneto field as described, being a unitary structure, is smooth on all surfaces, and presents a minimum of air resistance. The weight of the magnetic elements provides a flywheel effect, and, as the magnets are completely embedded in moldable material, cannot move, shift, or otherwise get out of adjustment under the most severe rotational stresses.

I may also desire to use a modified form of field in conjunction with this generator. The modified form is shown in Figures 3 and 4, and is described in more detail in a copending application of Philip F. Scofield, Serial No. 641,472, dated November 5, 1932.

In this modification the casings, gear trains, etc., are identical with those described, and the field 36 as shown in Figures 3 and 4 together with its supporting frame 37 may be directly substituted for the field described above. The field 36 is a unitary casting or forging of cobalt-chrome steel with inwardly projecting poles corresponding to the magnets 24, and charged alternately positive and negative. The unit is fastened to its supporting frame 37 by bolts 38 and to the mounting flange 21 in the same manner as the field structure 22.

This magneto field structure is adapted for use in all types of magneto electric generators, whether rotary, or oscillatory.

I claim:

1. In a magneto, a rotor comprising a flat circular cup of non-magnetic metal, a plurality of horseshoe magnets disposed in said cup and having their pole faces toward the center of said cup, said magnets being bound to said cup solely by a mass of moldable non-metallic non-magnetic material.

2. In a magneto, a rotor comprising a flat circular cup of non-magnetic metal, a plurality of horseshoe magnets disposed in said cup and having their pole faces toward the center of said cup, said magnets being embedded in a matrix of non-magnetic material adherent to said cup and said magnets.

3. In a magneto, a rotor comprising a flat circular cup of non-magnetic metal, a plurality of horseshoe magnets disposed in said cup and having their pole faces toward the center of said cup, said magnets being bound to said cup solely by a phenolithic condensation product.

4. In a magneto, a rotor comprising a flat circular cup of non-magnetic metal, a plurality of horseshoe magnets disposed in said cup and having their pole faces toward the center of said cup, said magnets being embedded in a matrix of non-magnetic material adherent to said cup and said magnets, and means fastened to said cup for rotating said rotor.

5. In a magneto, a rotor comprising a cup having a bottom and a cylindrical side wall, a plurality of horseshoe magnets disposed in said cup having their pole faces toward the center of said cup, said magnets being bound to said cup by a mass of moldable non-magnetic material filling said cup whereby the centrifugal force generated during rotation is carried by the side walls of said cup, and means for rotating said rotor attached to the bottom of said cup.

6. In a magneto having a base, a partition extending from said base, said partition having an open circular recess on one side adapted to house a rotor, and a gear recess on the other side adapted to house a gear train, a rotor in said circular recess having a shaft extending through said partition into said gear recess, a gear train in said gear recess, means for rotating said gear train, a removable cover for said circular recess, and an armature mounted on said cover and removable therewith.

RALPH M. HEINTZ.